US012785130B2

(12) United States Patent
Lee et al.

(10) Patent No.: US 12,785,130 B2
(45) Date of Patent: Nov. 3, 2026

(54) UNIT CELL INSPECTING DEVICE, ELECTRODE ASSEMBLY MANUFACTURING EQUIPMENT INCLUDING SAME, AND ELECTRODE ASSEMBLY MANUFACTURING METHOD

(71) Applicant: LG Energy Solution, Ltd., Seoul (KR)

(72) Inventors: Kwan Woo Lee, Daejeon (KR); Ha Yong Jung, Daejeon (KR); Jong Myung Lee, Daejeon (KR); Hyun Jae Park, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 566 days.

(21) Appl. No.: 18/278,139

(22) PCT Filed: Aug. 4, 2022

(86) PCT No.: PCT/KR2022/011540
§ 371 (c)(1),
(2) Date: Aug. 21, 2023

(87) PCT Pub. No.: WO2023/027373
PCT Pub. Date: Mar. 2, 2023

(65) Prior Publication Data
US 2024/0055644 A1 Feb. 15, 2024

(30) Foreign Application Priority Data
Aug. 26, 2021 (KR) ........................ 10-2021-0113449

(51) Int. Cl.
*H01M 10/04* (2006.01)
*G01J 5/00* (2022.01)
(Continued)

(52) U.S. Cl.
CPC ....... *H01M 10/0404* (2013.01); *G01J 5/0003* (2013.01); *H04N 23/23* (2023.01); *G01J 2005/063* (2013.01)

(58) Field of Classification Search
CPC .... G01J 5/0003; G01J 5/061; G01J 2005/063; G01J 25/72; H01M 10/0404;
(Continued)

(56) References Cited

U.S. PATENT DOCUMENTS

2014/0020235 A1 1/2014 Aramaki et al.
2014/0027643 A1 * 1/2014 Aramaki ................. H01M 4/04 250/341.8
(Continued)

FOREIGN PATENT DOCUMENTS

CN 103460488 A 12/2013
CN 105987919 A 10/2016
(Continued)

OTHER PUBLICATIONS

NLIR, Understanding Infrared Spectrum Wavelengths: NIR, MIR, and FIR, https://nlir.com/infrared-spectrum-wavelengths/, (Year: 2024).*
(Continued)

*Primary Examiner* — Daniel S Gatewood
(74) *Attorney, Agent, or Firm* — Lerner David LLP

(57) ABSTRACT

A unit cell inspecting device includes an inspection unit which captures an image of an edge of a unit cell using long-wave infrared rays and measures a position of an edge of an electrode provided in the unit cell. The inspection unit includes: a main heating part configured to heat the edge of the unit cell, thereby raising a temperature of the edge of the electrode provided in the unit cell; and an image capturing part configured to capture the image of the edge of the unit cell by using the long-wave infrared rays, thereby acquiring a thermal image of the edge of the electrode provided in the
(Continued)

unit cell; and an inspection part configured to measure the edge of the electrode in the thermal image captured by the image capturing part, thereby measuring the position of the electrode by using the measured edge of the electrode.

14 Claims, 14 Drawing Sheets

(51) Int. Cl.
*G01J 5/061* (2022.01)
*H04N 23/23* (2023.01)

(58) Field of Classification Search
CPC ......... H01M 10/0413; H01M 10/0436; H01M 10/4285; H04N 23/23; Y02E 60/10
See application file for complete search history.

(56) References Cited

U.S. PATENT DOCUMENTS

| | | | |
|---|---|---|---|
| 2020/0212494 | A1 | 7/2020 | Kim et al. |
| 2020/0370882 | A1 | 11/2020 | Jung et al. |

FOREIGN PATENT DOCUMENTS

| | | | |
|---|---|---|---|
| CN | 110832308 | A | 2/2020 |
| EP | 2696422 | A1 | 2/2014 |
| JP | 2005164428 | A | 6/2005 |
| JP | 2008153119 | A | 7/2008 |
| JP | 5438368 | B2 | 3/2014 |
| JP | 5940854 | B2 | 6/2016 |
| JP | 2017-135019 | A | 8/2017 |
| JP | 2018010770 | A | 1/2018 |
| KR | 100958649 | B1 | 5/2010 |
| KR | 101438421 | B1 | 9/2014 |
| KR | 101573587 | B1 | 12/2015 |
| KR | 101583692 | B1 | 1/2016 |
| KR | 101697698 | B1 | 1/2017 |
| KR | 20170079580 | A | 7/2017 |
| KR | 101774261 | B1 | 9/2017 |
| KR | 20190051624 | A | 5/2019 |
| KR | 20190113022 | A | 10/2019 |
| KR | 102133915 | B1 | 7/2020 |
| KR | 20210045181 | A | 4/2021 |
| KR | 102264685 | B1 | 6/2021 |
| KR | 20210071828 | A | 6/2021 |
| KR | 20210098538 | A | 8/2021 |
| WO | 2015058843 | A1 | 4/2015 |
| WO | 2019160220 | A1 | 8/2019 |

OTHER PUBLICATIONS

Supplemental European Search Report issued in Appln. No. 22861584.5 dated Dec. 5, 2024 (16 pages).
Extended European Search Report including Written Opinion for Application No. 22861584.5 dated Apr. 4, 2025, pp. 1-16.
Search report from International Application No. PCT/KR2022/011540, mailed Nov. 16, 2022.
Search Report dated Jun. 22, 26 from the Office Action for Chinese Application No. 202280013116.1 issued Jun. 24, 26, pp. 1-3.

* cited by examiner

UNIT CELL INSPECTING DEVICE, ELECTRODE ASSEMBLY MANUFACTURING EQUIPMENT INCLUDING SAME, AND ELECTRODE ASSEMBLY MANUFACTURING METHOD

CROSS-REFERENCE TO RELATED APPLICATION

The present application is a national phase entry under U.S.C. § 371 of International Application No. PCT/KR2022/011540 filed on Aug. 4, 2022, which claims the benefit of the priority of Korean Patent Application No. 10-2021-0113449, filed on Aug. 26, 2021, which is hereby incorporated by reference in its entirety.

TECHNICAL FIELD

The present invention relates to a unit cell inspecting device, in which an electrode included in a unit cell is measured and inspected by using long-wave infrared rays, electrode assembly manufacturing equipment including same, and an electrode assembly manufacturing method.

BACKGROUND ART

In general, secondary batteries refer to chargeable and dischargeable batteries, unlike primary batteries that are not chargeable. Such a secondary battery is being widely used in the high-tech electronic fields such as phones, laptop computers, and camcorders.

Such a secondary battery is classified into a can-type secondary battery in which an electrode assembly is embedded in a metal can and a pouch-type secondary battery in which an electrode assembly is embedded in a pouch. Also, the pouch-type secondary battery includes an electrode assembly, an electrolyte, and a pouch for accommodating the electrode assembly and the electrolyte.

Also, the electrode assembly includes one or more unit cells, and each of unit cells has a structure in which a first electrode and a second electrode are alternately disposed on each other with a separator therebetween. Here, the first electrode includes a positive electrode, and the second electrode includes a negative electrode. In particular, the negative electrode has a larger area than the positive electrode.

Here, the electrode assembly is formed by disposing unit cells in multiple stages on the basis of the electrode located on the outermost side of the unit cell. In this case, when the positive electrode is located on the outermost side of the unit cell, the positive electrode has a smaller area than the negative electrode, and thus, there is a significant deviation in the full length and full width between a unit cell and another unit cell.

DISCLOSURE OF THE INVENTION

Technical Problem

According to the present invention, the position of a negative electrode included in a unit cell can be accurately measured by using long-wave infrared rays. Accordingly, the unit cells can be disposed in multiple stages on the basis of the negative electrode, and as a result, it is possible to significantly reduce a deviation in the full length and full width between a unit cell and another unit cell. That is, an object of the present invention is to provide a unit cell inspecting device, which can accurately measure the position of a negative electrode by using the long-wave infrared rays even when the negative electrode is located inside the unit cell, electrode assembly manufacturing equipment including same, and an electrode assembly manufacturing method.

Technical Solution

A unit cell inspecting device according to the present invention includes an inspection unit which captures an image of an edge of a unit cell by using long-wave infrared rays and measures a position of an edge of an electrode provided in the unit cell, wherein the inspection unit includes: a main heating part configured to heat the edge of the unit cell, thereby raising a temperature of the edge of the electrode provided in the unit cell; and an image capturing part configured to capture the image of the edge of the unit cell by using the long-wave infrared rays, thereby acquiring a thermal image of the edge of the electrode provided in the unit cell; and an inspection part configured to measure the edge of the electrode in the thermal image captured by the image capturing part, thereby measuring the position of the electrode by using the measured edge of the electrode.

The unit cell may have a structure in which an electrode is located between a separator and a separator, and the image capturing part may acquire the thermal image of the edge of the electrode provided in the unit cell as the long-wave infrared rays pass through the separator.

The image capturing part may be provided with four long-wave infrared cameras that respectively capture images of edges of the unit cell, the main heating part may be provided with four long-wave infrared lamps that respectively heat the edges of the unit cell by using the high-temperature light, thereby raising the temperature of the electrode provided in the unit cell, and the four long-wave infrared lamps may be respectively coupled to the four long-wave infrared cameras.

The inspection unit may further include an auxiliary heating part which supports and heats each of both ends of the unit cell positioned in the image capturing part, thereby raising the temperature of the edge of the electrode provided in the unit cell.

The unit cell inspecting device further includes a conveyance unit which conveys the unit cell to the inspection unit.

The unit cell inspecting device may further include a body unit on which the inspection unit and the conveyance unit are installed, wherein the body unit includes a lower body on which the conveyance unit is installed, an upper body which is installed above the lower body, and a first bracket which couples the inspection unit to the upper body, and the first bracket includes an up-down coupling portion coupled to the upper body, a left-right coupling portion coupled to the up-down coupling portion, and a front-rear coupling portion having one end coupled to the left-right coupling portion and the other end coupled to the image capturing part.

The up-down coupling portion may be coupled to the upper body such that the height of the up-down coupling portion is adjustable in the thickness direction of the unit cell, and the height of the image capturing part is adjusted with respect to the unit cell, the left-right coupling portion may be coupled to the up-down coupling portion such that the position of the left-right coupling portion is adjustable in the full length direction of the unit cell, and the position of the image capturing part is adjusted in the full length direction of the unit cell, and the image capturing part may be coupled to the front-rear coupling portion such that the position of the image capturing part is adjustable in the full width direction of the unit cell, and accordingly, the position of the image capturing part is adjusted in the full width direction of the unit cell.

The body unit may further include a second bracket which connects the front-rear coupling portion and the auxiliary heating part, which are positioned vertically, to each other to increase a fixing force of the front-rear coupling portion, and the front-rear coupling portion may be coupled to the second bracket such that the height of the front-rear coupling portion is adjustable in the thickness direction of the unit cell.

The inspection part may compare the thermal image captured by the image capturing part with a normal image of an edge of an electrode input in advance, thereby further inspecting whether the edge of the electrode is deformed or not.

The electrode may include a negative electrode.

Also, electrode assembly manufacturing equipment according to the present invention includes: a unit cell supply device configured to supply a unit cell; the unit cell inspecting device of claim 1, which uses long-wave infrared rays to capture an image of an edge of the unit cell supplied by the unit cell supply device, measures a position of an edge of an electrode provided in the unit cell, and uses the measured edge of the electrode to measure the position of the electrode; and a unit cell placing device configured to sequentially place unit cells on the basis of the position of the electrode measured by the unit cell inspecting device.

The unit cell placing device may include a unit cell placing unit configured to sequentially place the unit cells in which the positions of the electrodes have been measured and a unit cell inspecting unit configured to inspect the placement state of the unit cells which are sequentially placed.

Also, an electrode assembly manufacturing method according to the present invention includes: (a) supplying a unit cell; (b) using long-wave infrared rays to capture an image of an edge of the supplied unit cell, measuring a position of an edge of an electrode provided in the unit cell, and using the measured edge of the electrode to measure the position of the electrode; and (c) sequentially placing the unit cells, in which the positions of the electrodes have been measured, to manufacture an electrode assembly, wherein the operation of (b) includes: a conveyance process of conveying the unit cell supplied during the operation of (a); a heating process of heating the edge of the conveyed unit cell to raise temperature of the electrode provided in the unit cell; an image capturing process of using the long-wave infrared rays to capture the image of the edge of the unit cell, thereby acquiring a thermal image of the edge of the electrode provided in the unit cell; and an inspection process of measuring the edge of the electrode in the thermal image of the edge of the electrode and using the measured edge of the electrode to measure the position of the electrode.

A long-wave infrared lamp may be used to heat the edge of the unit cell during the heating process, and a long-wave infrared camera may be used to capture the image of the edge of the unit cell during the image capturing process.

The unit cell may have a structure in which an electrode is located between a separator and a separator, and the electrode is provided as a negative electrode, wherein during the image capturing process, the long-wave infrared rays are used and allowed to pass through the separator, thereby capturing the image of the edge of the negative electrode.

Advantageous Effects

The unit cell inspecting device according to the present invention includes the inspection unit and thus can capture the image of the edge of the unit cell by using the long-wave infrared rays, and also can accurately measure the position of the edge of the electrode (that is, the negative electrode edge) included in the unit cell, and further can inspect whether the edge of the electrode is deformed or not.

Also, the electrode assembly manufacturing equipment according to the present invention includes the unit cell inspecting device and thus can dispose the unit cells in multiple stages on the basis of the negative electrode included in the unit cell. Accordingly, the deviation in the full length and full width between the one unit cell and another unit cell can be significantly reduced, and as a result, it is possible to prevent the failure in placement of the unit cells.

MODE FOR CARRYING OUT THE INVENTION

Figure 1:
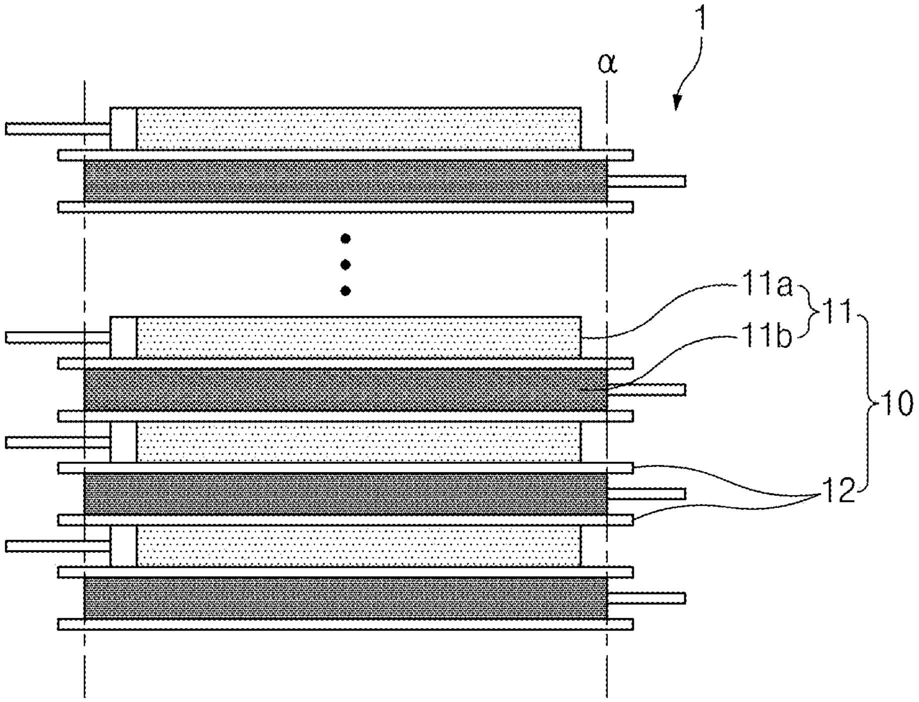
FIG. 1 is a side view illustrating an electrode assembly according to a first embodiment of the present invention.

Hereinafter, embodiments of the present invention will be described in detail with reference to the accompanying drawings so as to be easily carried out by a person skilled in the art to which the present invention pertains. However, the present invention may be embodied in various different forms, and is not limited to the embodiments described herein. Also, in the drawings, parts irrelevant to the description will be omitted to clearly describe the present invention, and similar elements will be designated by similar reference numerals throughout the specification.

Electrode Assembly According to First Embodiment of Invention

An electrode assembly 1 according to a first embodiment of the present invention has a structure in which one or two or more unit cells 10 are disposed in the up-down direction as illustrated in FIG. 1, and each of the unit cells 10 has a structure in which electrodes 11 and separators 12 are disposed alternately.

The electrodes 11 include a positive electrode 11*a* and a negative electrode 11*b*, and the negative electrode 11*b* has a larger area than the positive electrode 11*a*. Also, each of the separators 12 has a larger area than the negative electrode 11*b*.

For example, referring to FIG. 1, the electrode assembly 1 has a structure in which three or more unit cells 10 are disposed in the up-down direction, and each of the unit cells 10 has a four layer structure in which the positive electrode 11*a*, the separator 12, the negative electrode 11*b*, and the separator 12 are sequentially disposed in the up-down direction.

In the electrode assembly 1 having the above structure according to the first embodiment of the present invention, the unit cells 10 are disposed in multiple stages on the basis of the negative electrode 11*b* included in the unit cell.

That is, referring to FIG. 1, the unit cells 10 in the electrode assembly 1 according to the first embodiment of the present invention are disposed on the basis of the negative electrode 11*b* disposed between a separator 12 and another separator 12. Accordingly, the unit cells are aligned on the basis of a vertical line 'a', and thus, deviations in the full length and full width between the unit cell 10 and another unit cell 10 may be reduced, as a result, it is possible to prevent a failure in placement of the unit cells 10.

Here, the negative electrode 11*b* disposed between the separator 12 and another separator 12 is measured by a unit cell inspecting device according to a second embodiment of the present invention. In particular, a unit cell inspecting device 200 according to the second embodiment of the present invention may accurately measure the position of the negative electrode 11*b* located inside the unit cell 10, and particularly, may inspect whether an edge of the negative electrode 11*b* is deformed or not.

Hereinafter, the unit cell inspecting device 200 according to the second embodiment of the present invention will be described in detail with reference to the accompanying drawings.

Meanwhile, a unit cell 10 having a four layer structure in which a positive electrode 11*a*, a separator 12, a negative electrode 11*b*, and a separator 12 are sequentially disposed on each other in the up-down direction, will be described as one example.

Unit Cell Inspecting Device According to Second Embodiment of Invention

The unit cell inspecting device 200 according to the second embodiment of the present invention may use long-wave infrared rays to capture an image of an edge of the unit cell 10, and accordingly may measure the position of the electrode (that is, a negative electrode) included in the unit cell 10 and inspect whether the edge of the electrode 11 is deformed or not.

That is, the unit cell inspecting device 200 according to the second embodiment of the present invention includes a conveyance unit 210, an inspection unit 220, and a body unit 230, as illustrated in FIGS. 2 to 9.

Conveyance Unit

The conveyance unit 210 is to convey the supplied unit cell 10 to the inspection unit.

That is, the conveyance unit 210 includes a conveyor belt, which conveys the supplied unit cell 10 to the inspection unit 220 and suction parts, which are provided at certain intervals on the conveyor belt and make the unit cell 10 adhere to the conveyor belt so that the unit cell 10 is conveyed along the conveyor belt. Here, each of the suction parts suction the unit cell 10 using air suction force, and accordingly make the unit cell 10 adhere to the conveyor belt.

In the conveyance unit 210 having the above structure, when the unit cell 10 is supplied, the unit cell 10 is made to adhere to the conveyor belt by the suction parts. The unit cell 10 adhering to the conveyor belt is conveyed to the inspection unit 220 by the conveyor belt. Here, when the suction force of the suction part is removed, the unit cell 10 is separated from the conveyor belt.

Inspection Unit

The inspection unit 220 has a structure that captures an image of the edge of the unit cell 10 by using the long-wave infrared rays, measures the edge of the electrode 11, preferably, the negative electrode 11*b* included in the unit cell 10, and measures the position of the negative electrode 11*b* by using the measured edge of the negative electrode 11*b*. In particular, when measuring the edge of the negative electrode 11*b*, the inspection unit 220 also inspects whether the edge of the negative electrode 11*b* is deformed or not.

That is, the inspection unit 220 includes a main heating part 221, an image capturing part 222, an inspection part 223, and an auxiliary heating part 224.

The main heating part 221 is to raise the temperature of the edge of the electrode 11 included in the unit cell 10 in order to capture the image of the edge of the electrode 11 by using the long-wave infrared rays.

That is, the main heating part 221 heats the edge of the unit cell 10 conveyed from the conveyance unit 210 and raises the temperature of the electrode 11 included in the unit cell 10. Here, the electrode 11 may include a positive electrode 11*a* and a negative electrode 11*b*. Accordingly, the main heating part 221 raises the temperature of the edge of the positive electrode 11*a* and the edge of the negative electrode 11*b* which are included in the unit cell 10.

Meanwhile, the main heating part 221 is provided with four long-wave infrared lamps that respectively heat the edges of the unit cell 10 by using the high-temperature light, thereby raising the temperatures of the edges of the electrode 11.

Meanwhile, each of the long-wave infrared lamps emits the long-wave infrared rays, and illuminates and heats an object by using a light source. Here, the long-wave infrared rays refer to electromagnetic waves having a wavelength of about 700 nm and correspond to the outside of the red region of the light spectrum. That is, when the electrode 11 included in the unit cell absorbs the long-wave infrared rays, the temperature is raised due to the thermal motion in the electrode 11.

The image capturing part 222 is to capture the image of the edge of the unit cell by using the long-wave infrared rays, thereby acquiring a thermal image of the edge of the electrode 11 included in the unit cell 10.

Figure 2:
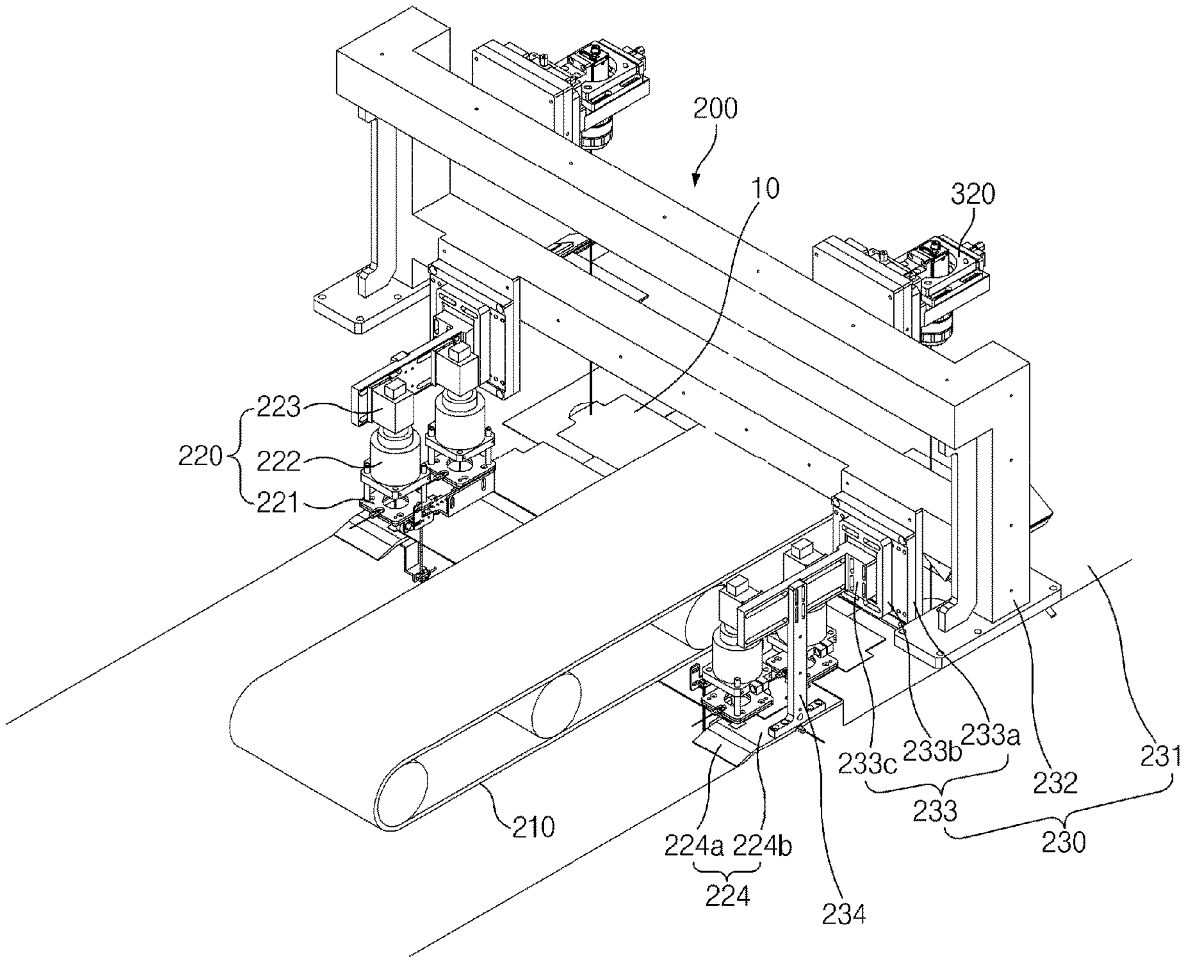
FIG. 2 is a front perspective view illustrating a unit cell inspecting device according to a second embodiment of the present invention.

That is, referring to FIG. 2, the image capturing part 222 is provided above the edge of the unit cell 10 and provided with four long-wave infrared cameras that respectively capture images of the edges of the unit cell 10. The four long-wave infrared cameras respectively acquire thermal images of the edges of the electrode 11 which are positioned at the edges of the unit cell 10. In other words, referring to FIG. 2, the image capturing part 222 acquires the thermal images of the edges of the positive electrode 11*a* disposed on the uppermost end of the unit cell 10 and the edges of the negative electrode 11*b* disposed inside the unit cell 10. Here, the negative electrode 11*b* has a larger area than the positive electrode 11*a*, and thus, the edges of the positive electrode 11*a* and the edges of the negative electrode 11*b* are shown as overlapping each other in the thermal images (see FIGS. 13 and 14).

Meanwhile, the long-wave infrared camera is referred to as a thermal image infrared camera and has a function of easily detecting heat emitted from an object.

Accordingly, the four long-wave infrared cameras may easily detect heat which is generated from the edges of the negative electrode 11*b* between a separator 12 and another separator 12 of the unit cell 10, and thus, may capture the thermal image of the edges of the negative electrode 11*b*.

The image capturing part 222 having the above structure may accurately capture the thermal images of the edges of the positive electrode 11*a* disposed on the uppermost end of the unit cell 10 and the edges of the negative electrode 11*b* disposed inside the unit cell 10.

Meanwhile, the four long-wave infrared lamps are respectively coupled to the four long-wave infrared cameras. That is, the long-wave infrared lamps are located between the long-wave infrared cameras and the edges of the unit cell 10 and coupled to the lower portions of the long-wave infrared cameras. Accordingly, an assembly, in which the long-wave infrared lamps and the long-wave infrared cameras are combined, may be constituted.

The inspection part 223 measures the image of the edge of the electrode 11 in the thermal image captured by the image capturing part 222, and measures the position of the electrode 11 by using the measured edge of the electrode 11. That is, images of the edges of the electrode 11 are measured in the four thermal images captured by the four long-wave infrared cameras, and the position (or image) of the electrode 11 is measured by connecting the measured four edges of the electrode 11 to each other.

In particular, the inspection part 223 may accurately measure the position (or image) of the electrode 11 located between a separator 12 and another separator 12.

Meanwhile, the inspection part 223 may compare the thermal image captured by the image capturing part 222 with a normal image of an edge of an electrode input in advance, thereby inspecting whether the edge of the electrode 11 is deformed or not. That is, the inspection part 223 measures the images of the edges of the electrode 11 in the captured thermal images and then makes a comparison with edges of the normal electrode input in advance. Here, when the edge of the measured electrode 11 is out of a normal range due to folding, wrinkling, or lifting, the edge is determined as defective. When being within the normal range, the edge is determined as normal.

Meanwhile, the inspection unit 220 may further include an auxiliary heating part 224 to increase heating performance for electrode edges. That is, the main heating part 221 heats the upper surface of the edge of the electrode 11, and the auxiliary heating part 224 heats the bottom surface of the edge of the electrode 11.

When described in more detail, the auxiliary heating part 224 includes a support plate 224*a*, which supports each of both ends, in the full length direction, of the unit cell 10 positioned in the image capturing part 222, and a heating piece 224*b*, which heats each of both ends of the unit cell 10 supported by the support plate 224*a*. That is, in the auxiliary heating part 224, when both ends of the unit cell 10 are supported by the support plates 224*a*, the heating pieces 224*b* heat both ends of the unit cell 10 supported by the support plates 224*a* and thus raise the temperatures of the edges of the electrode 11 included in the unit cell 10.

Therefore, the inspection unit 220 according to the present invention utilizes the long-wave infrared rays and thus may accurately measure the position of the electrode 11 included in the unit cell 10, in particular, the negative electrode 11*b* that is the electrode located between a separator 12 and another separator 12. In particular, it is possible to easily inspect whether the edge of the electrode 11 is deformed or not.

Body Unit

The body unit 230 is a unit to which the inspection unit 220 and the conveyance unit 210 are installed, and includes a lower body 231, to which the conveyance unit 210 is installed, an upper body 232, which is installed above the lower body 231, and a first bracket 233, which couples the inspection unit 220 to the upper body 232.

Here, the first bracket 233 includes an up-down coupling portion 233*a* coupled to the upper body 232, a left-right coupling portion 233*b* coupled to the up-down coupling portion 233*a*, and a front-rear coupling portion 233*c* having one end coupled to the left-right coupling portion 233*b* and the other end extended long in the conveyance direction of the unit cell 10 and coupled to the image capturing part 222.

In particular, the up-down coupling portion 233*a* is coupled to the upper body 232 and has a structure coupled such that the height thereof is adjustable in a direction toward the unit cell 10 (in the up-down direction when viewed in FIG. 2) or in the opposite direction. Accordingly, the height of the image capturing part 222 may be adjusted with respect to the unit cell 10. For example, the up-down coupling portion 233*a* has a first long hole 233*a*-1 that is formed long in the thickness direction of the unit cell 10, and the upper body 232 has a first bolt 233*a*-2 which passes through the first long hole and is coupled to a first nut 233*a*-3. Accordingly, the up-down coupling portion 233*a* may be raised or lowered within the first long hole according to fastening and loosening of the first nut. Therefore, as the image capturing part 222 moves while interlocking with the up-down coupling portion 233*a*, the height of the image capturing part 222 may be adjusted with respect to the unit cell 10.

Also, the left-right coupling portion 233*b* is coupled to the up-down coupling portion 233*a* and has a structure coupled such that the position thereof is adjustable in the full length direction of the unit cell 10 (in the full length direction of the unit cell when referring to FIG. 2). Accordingly, the position of the image capturing part 222 may be adjusted in the full length direction of the unit cell 10. For example, the left-right coupling portion 233*b* has a second long hole 233*b*-1 that is formed long in the full length direction of the unit cell 10, and the up-down coupling portion 233*a* has a second bolt 233*b*-2 which passes through the second long hole of the left-right coupling portion 233*b* and is coupled to a second nut 233*b*-3. Accordingly, the left-right coupling portion 233*b* may be moved within the second long hole in the full length direction of the unit cell 10 according to fastening and loosening of the second nut. As a result, the position of the image capturing part 222 may be adjusted in the full length direction of the unit cell 10 while interlocking with the left-right coupling portion 233*b*.

Also, the image capturing part 222 is coupled to the front-rear coupling portion 233*c* and has a structure coupled such that the position thereof is adjustable in the full width direction of the unit cell 10 (in the full width direction of the unit cell when referring to FIG. 2). Accordingly, the position of the image capturing part 222 may be adjusted in the full width direction of the unit cell 10. For example, the front-rear coupling portion 233*c* has a third long hole 233*c*-1 that is formed long in the full width direction of the unit cell 10, and the image capturing part 222 has a third bolt 233*c*-2 which passes through the third long hole of the front-rear coupling portion 233*c* and is coupled to a third nut 233*c*-3. Accordingly, the position of the image capturing part 222 may be adjusted within the third long hole in the full width direction of the unit cell 10 according to fastening and loosening of the third nut.

Therefore, the present invention includes the first bracket 233 and thus may accurately adjust the position of the image capturing part 222 to correspond to the edge of the unit cell 10.

Meanwhile, the body unit 230 further includes a second bracket 234 which connects the front-rear coupling portion 233*c* and the auxiliary heating part 224, which are positioned vertically, to each other to increase a fixing force of the image capturing part 222 coupled to the front-rear coupling portion 233*c*.

That is, the second bracket 234 is to increase the fixing force of the image capturing part 222, and the fixing force of the image capturing part 222 may be increased by connecting an end of the front-rear coupling portion 233*c* to the auxiliary heating part 224.

Meanwhile, the front-rear coupling portion 233*c* has a structure coupled to the second bracket 234 such that the height thereof is adjustable in the up-down direction. For example, the second bracket 234 has a fourth long hole 234*a* formed long in a direction toward the unit cell, and the end of the front-rear coupling portion 233*c* has a fourth bolt 234*b* which passes through the fourth long hole and is coupled to a fourth nut 234*c*. Accordingly, the front-rear coupling portion 233*c* may be moved within the fourth long hole of the second bracket 234 according to fastening and loosening of the fourth nut.

Therefore, the unit cell inspecting device 200 according to the second embodiment of the present invention may accurately measure the edge of the electrode 11 included in the unit cell 10, in particular, the edge of the negative electrode 11*b* by using the long-wave infrared rays. In particular, it is possible to inspect whether the negative electrode 11*b* is deformed or not.

Hereinafter, an inspection method of the unit cell inspecting device 200 according to the second embodiment of the present invention will be described.

First, when the unit cell 10 is supplied, the conveyance unit 210 conveys the unit cell 10 to the inspection unit 220. Here, both ends of the unit cell 10 are respectively supported by the auxiliary heating part 224. In the above state, the main heating part 221 and the auxiliary heating part 224 of the inspection unit 220 heat both ends of the unit cell 10 and raise the temperature of the electrode 11 included in the unit cell 10. Here, the main heating part 221 is provided with four long-wave infrared lamps and may effectively raise the temperatures of the edges of the electrode 11 included in the unit cell 10.

When the temperature of the electrode 11 is raised, the image capturing part 222 captures an image of the edge of the unit cell by using the long-wave infrared rays, and acquires a thermal image of the edge of the electrode 11 included in the unit cell 10, preferably, the edge of the negative electrode 11*b*. The image capturing part 222 directly acquires the thermal image when the negative electrode 11*b* is located on the uppermost end of the unit cell 10, and acquires the thermal image, through the penetration of the separator 12, when the negative electrode 11*b* is located inside the unit cell 10.

Next, the inspection part 223 may measure the edges of the negative electrode 11*b* in the acquired thermal images of the edges of the negative electrode 11*b*, and the position of the negative electrode 11*b* may be measured by connecting the measured edges of the negative electrode 11*b* to each other. In particular, the inspection part 223 inspects whether the edge of the electrode 11 is deformed or not, by comparing the thermal image of the edge of the negative electrode 11*b* with the input normal image of the edge of the electrode 11. That is, the inspection part 223 may determine that the negative electrode 11*b* is defective when the edge thereof is deformed such as folding, wrinkling, or rupturing.

Hereinafter, in describing another embodiment of the present invention, components having the same configuration and function as those in the foregoing embodiment are given the same reference numerals, and their duplicated description will be omitted.

Figure 10:
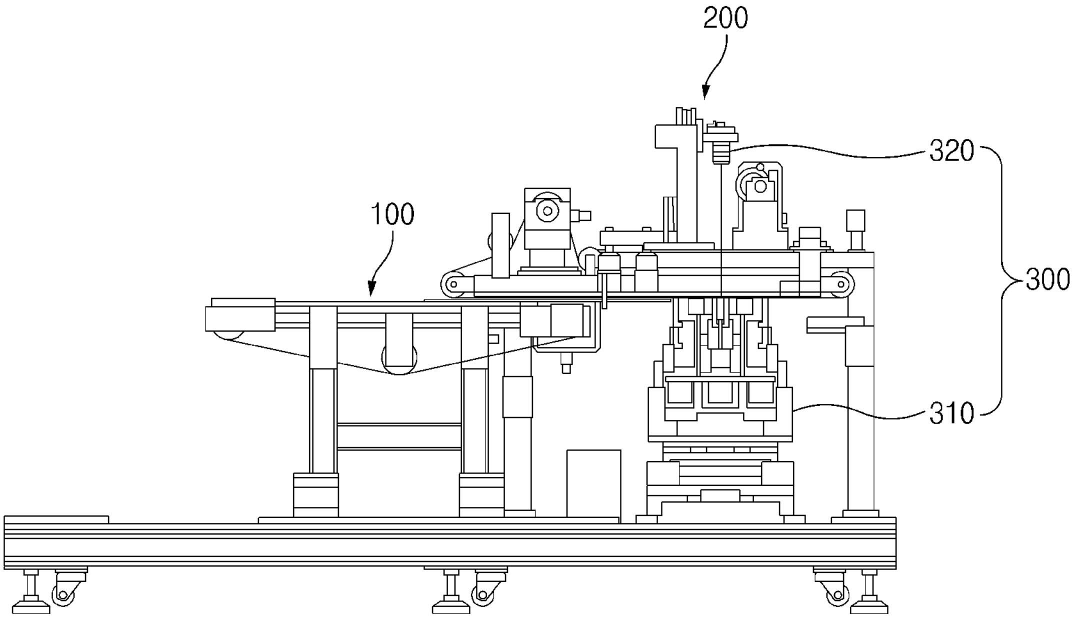
FIG. 10 is a side view illustrating electrode assembly manufacturing equipment according to a third embodiment of the present invention.

Electrode Assembly Manufacturing Equipment According to Third Embodiment of Invention The electrode assembly manufacturing equipment according to the third embodiment of the present invention has, as illustrated in FIG. 10, a structure that includes the above-described inspecting device according to the second embodiment.

Accordingly, an electrode assembly 1 may be manufactured by disposing unit cells 10 in multiple stages on the basis of a negative electrode 11*b* that is an electrode included in a unit cell 10.

That is, the electrode assembly manufacturing equipment according to the third embodiment of the present invention includes a unit cell supply device 100, which supplies a unit cell 10, a unit cell inspecting device 200, which uses long-wave infrared rays to capture an image of an edge of the unit cell 10 supplied from the unit cell supply device 100, measures a position of an edge of an electrode 11 provided in the unit cell 10, and uses the measured edge of the electrode 11 to measure the position of the electrode 11, and a unit cell placing device 300, which sequentially places unit cells 10, which have been measured by the unit cell inspecting device 200, to manufacture the electrode assembly 1.

Here, the unit cell inspecting device 200 has the same configuration and function as the unit cell inspecting device 200 according to the second embodiment, and accordingly, duplicated descriptions thereof will be omitted.

The unit cell placing device 300 places the unit cells 10 on the basis of the negative electrodes 11*b* that are electrodes included in the unit cells measured in the unit cell inspecting device 200. Accordingly, it is possible to reduce deviations in the full length and full width between a unit cell 10 and another unit cell 10.

For example, the unit cell placing device 300 includes a unit cell placing unit 310, which places the unit cells 10, which have been inspected by the unit cell inspecting device 200, on the basis of the negative electrodes 11*b* included in the unit cells 10, and a unit cell inspecting unit 320, which inspects the placement state of the unit cells 10 which are sequentially placed by the unit cell placing unit 310.

That is, the unit cell inspecting unit 320 captures an image of a unit cell 10 located on the uppermost end and measures the position and shape of the unit cell 10. Next, another unit cell 10 is stacked on the uppermost unit cell 10. Then, the position and shape of another unit cell 10 are measured by capturing an image of another unit cell 10 disposed on the uppermost unit cell 10. Next, a skew fail (fail such as distortion) is inspected by comparing the uppermost unit cell 10 with another unit cell 10.

Meanwhile, the unit cell inspecting unit 320 is coupled to an upper body 232 and uses a vision camera.

Meanwhile, the unit cell placing unit 310 may lower a placement plate, on which the unit cell 10 is placed, at a certain distance so that the height of the unit cell 10 located on the uppermost end is maintained constant.

Figure 3:
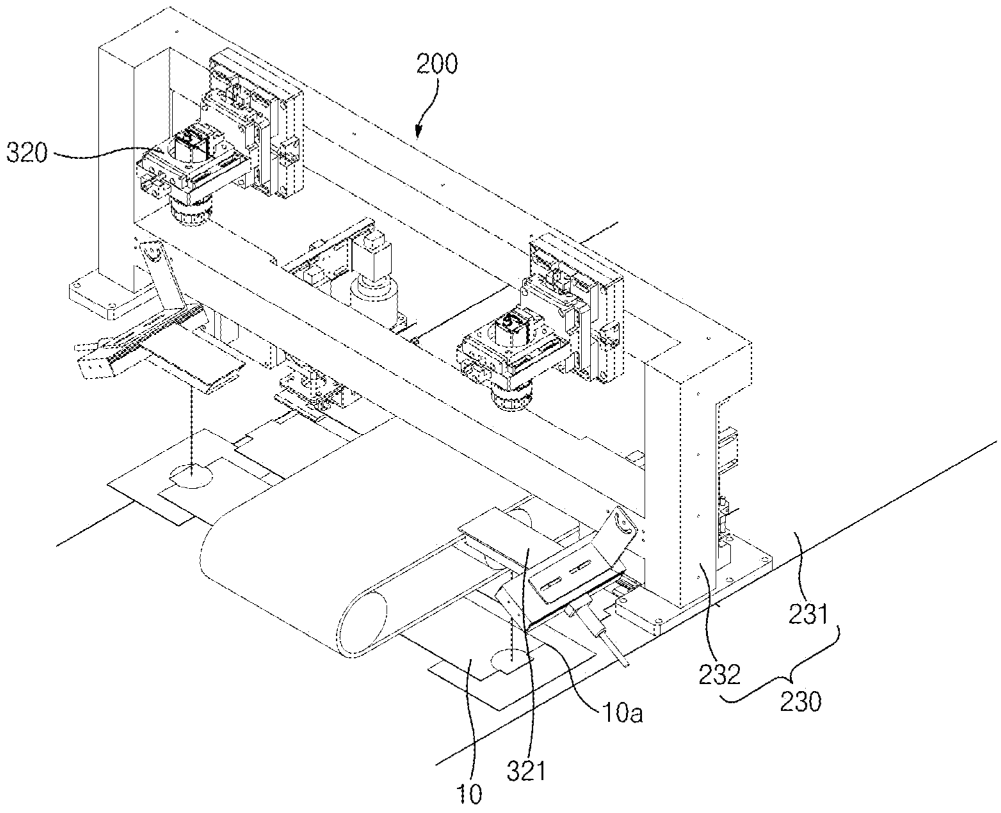
FIG. 3 is a rear perspective view illustrating the unit cell inspecting device according to the second embodiment of the present invention.
Figure 4:
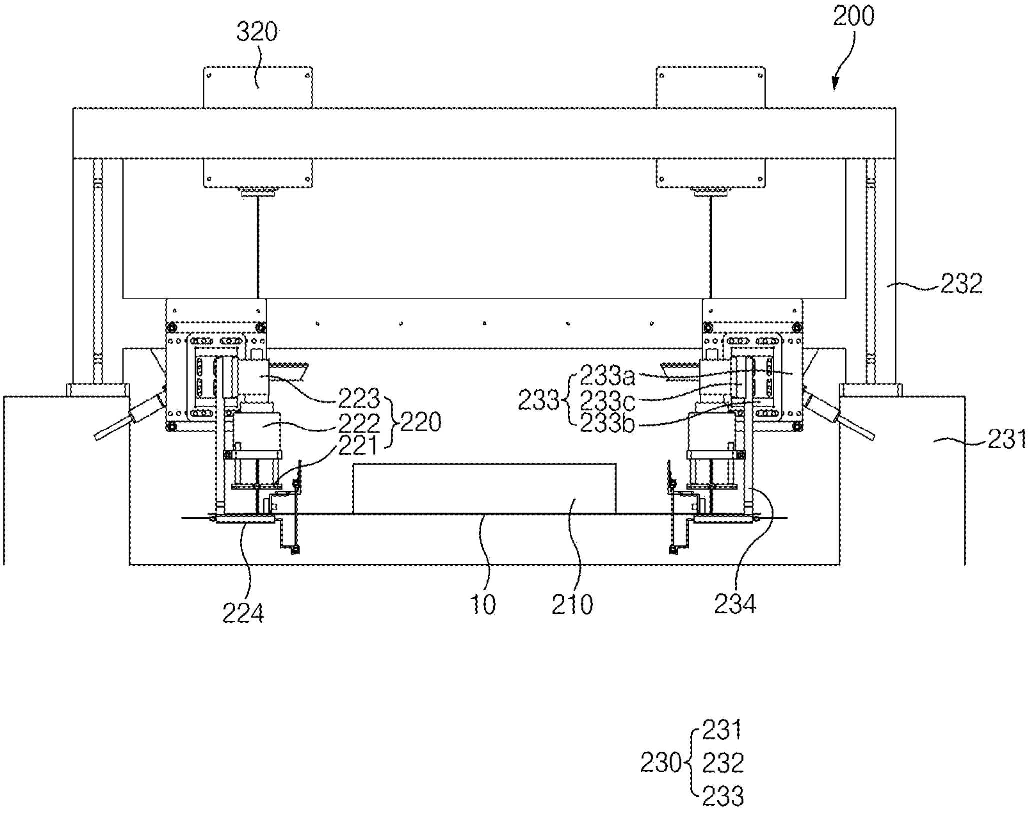
FIG. 4 is a front view illustrating the unit cell inspecting device according to the second embodiment of the present invention.
Figure 5:
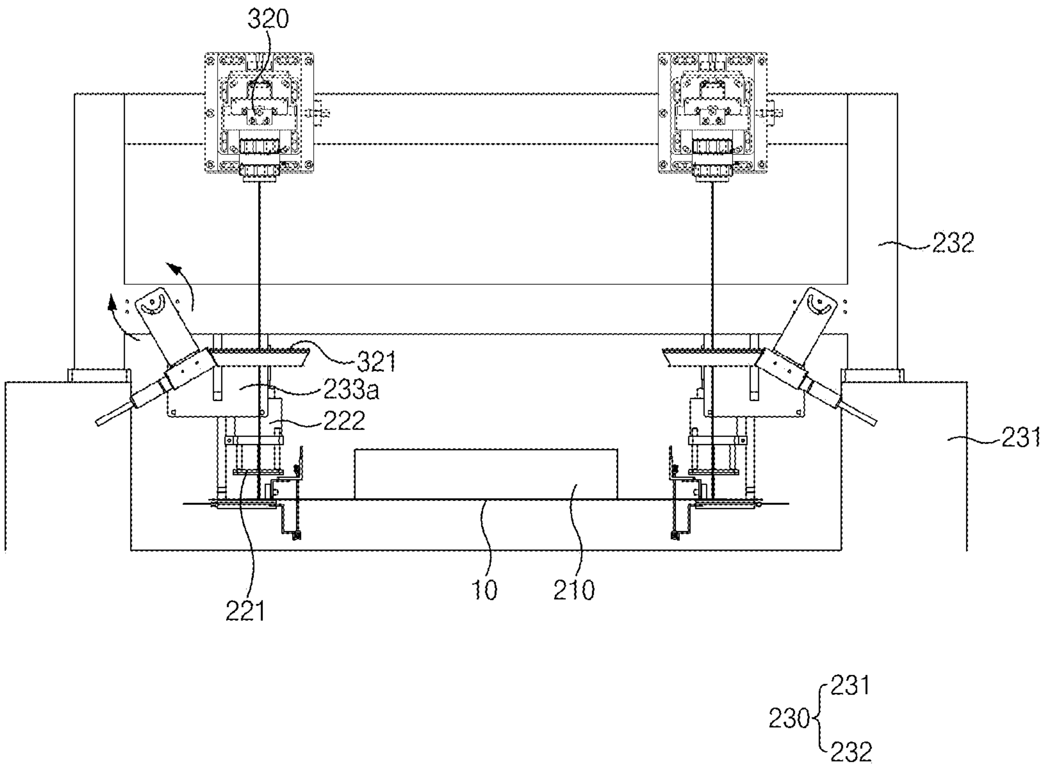
FIG. 5 is a rear view illustrating the unit cell inspecting device according to the second embodiment of the present invention.
Figure 6:
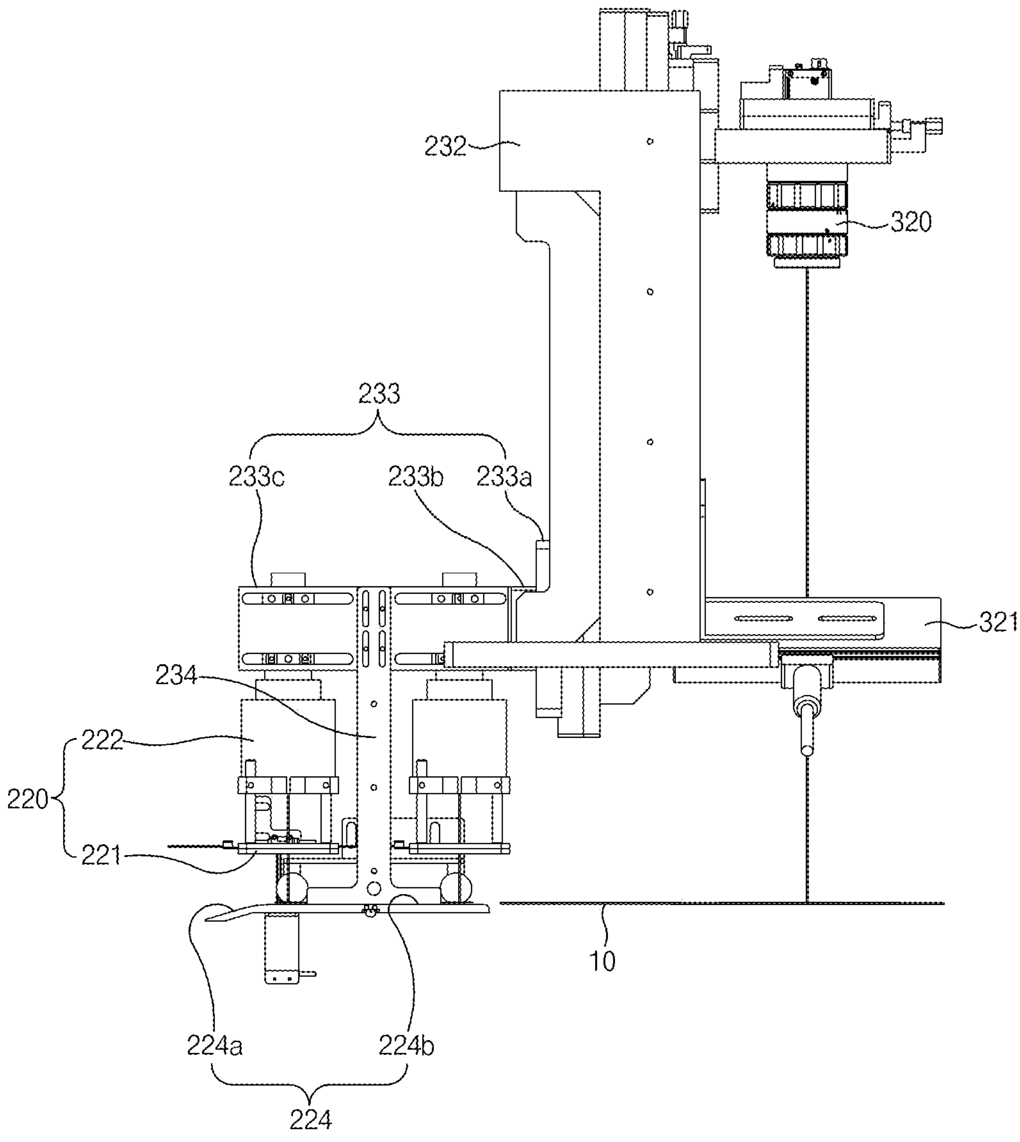
FIG. 6 is a side view illustrating the unit cell inspecting device according to the second embodiment of the present invention.
Figure 7:
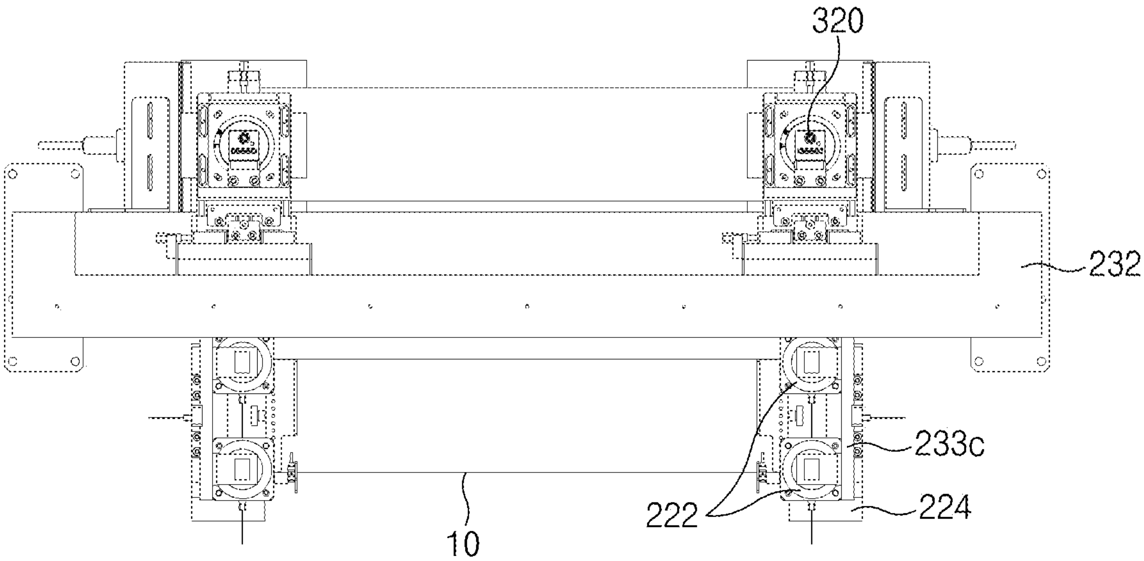
FIG. 7 is a plan view illustrating the unit cell inspecting device according to the second embodiment of the present invention.
Figure 8:
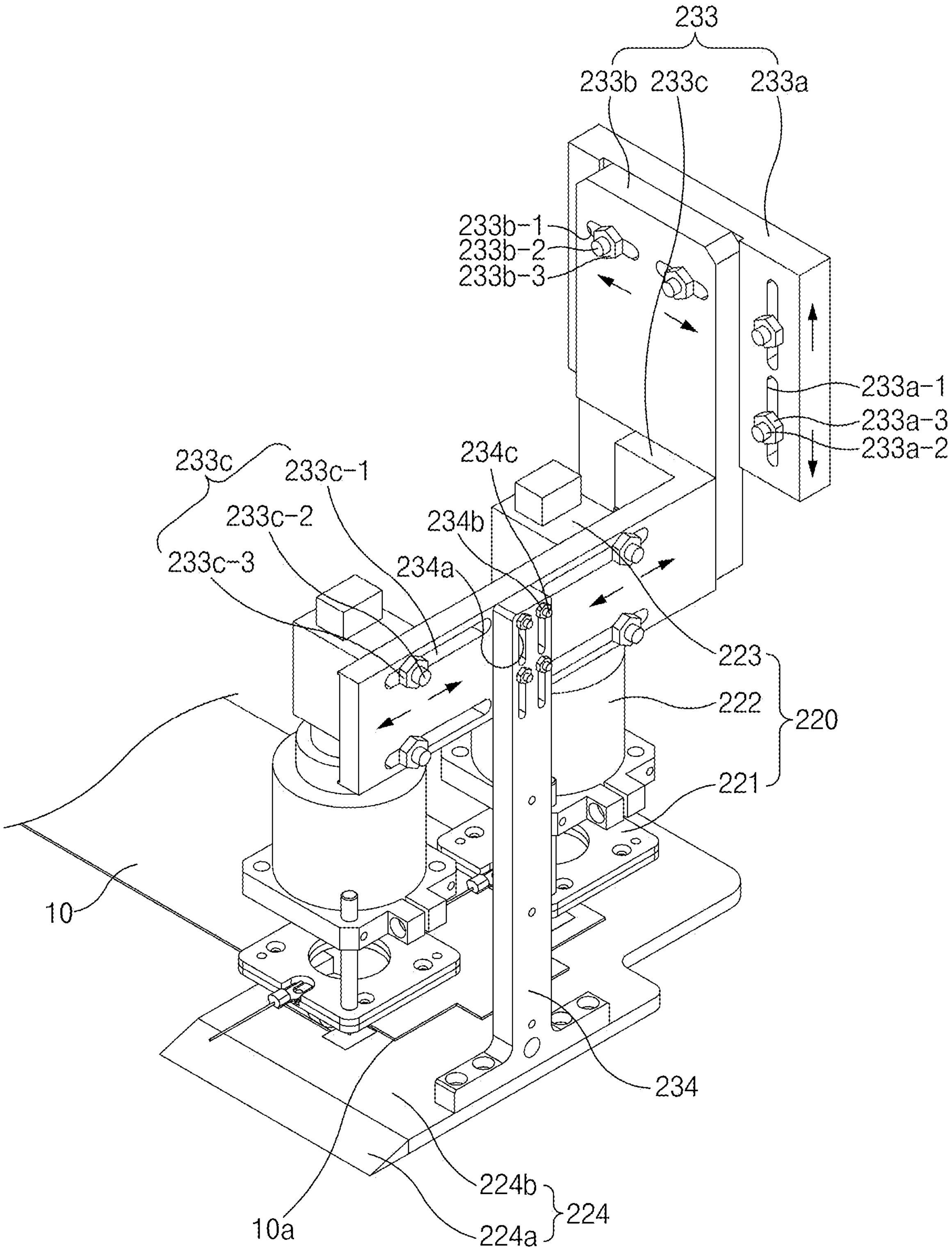
FIG. 8 is a perspective view illustrating a second bracket of the unit cell inspecting device according to the second embodiment of the present invention.
Figure 9:
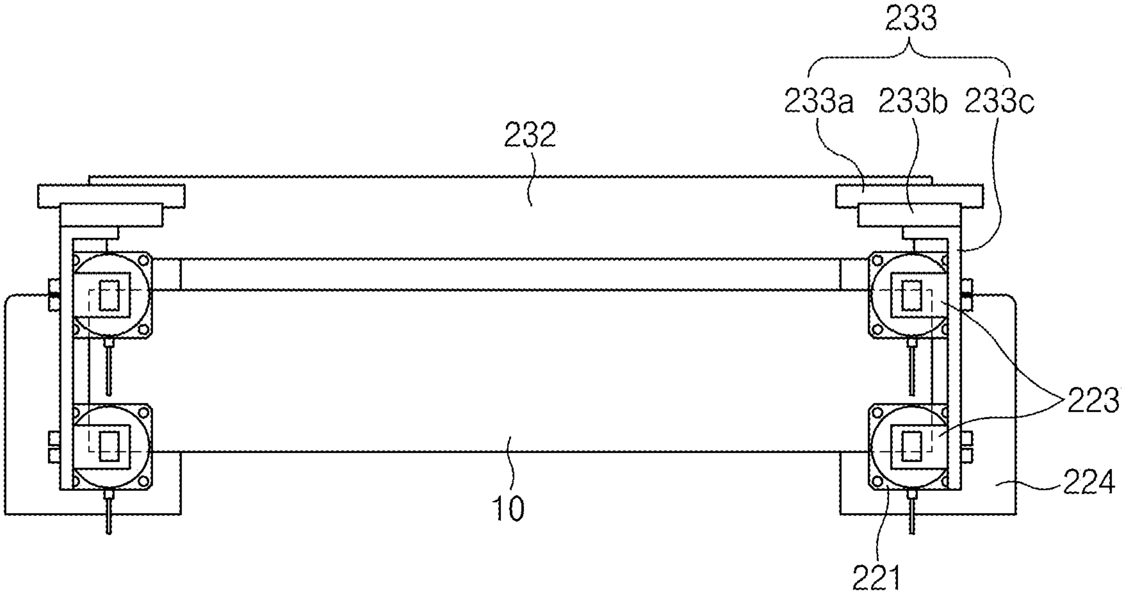
FIG. 9 is a plan view illustrating a state in which an image of an edge of a unit cell is captured by the unit cell inspecting device according to the second embodiment of the present invention.

Meanwhile, the unit cell inspecting unit 320 further includes a unit cell lighting part 321 that illuminates the unit cells 10 which are being placed, and the unit cell lighting part 321 is hinge-coupled to the upper body 232 and coupled thereto so as to be rotatable upward or downward about a hinge when viewed in FIG. 3. Accordingly, it is possible to stably illuminate the unit cells 10.

Therefore, the electrode assembly manufacturing equipment according to the third embodiment of the present invention may enhance the degree of alignment by placing the unit cells 10 on the basis of the negative electrode 11*b*, and minimize deviations in the full length and full width between a unit cell 10 and another unit cell 10.

Hereinafter, a manufacturing method using the electrode assembly manufacturing equipment according to the third embodiment of the present invention will be described.

Figure 11:
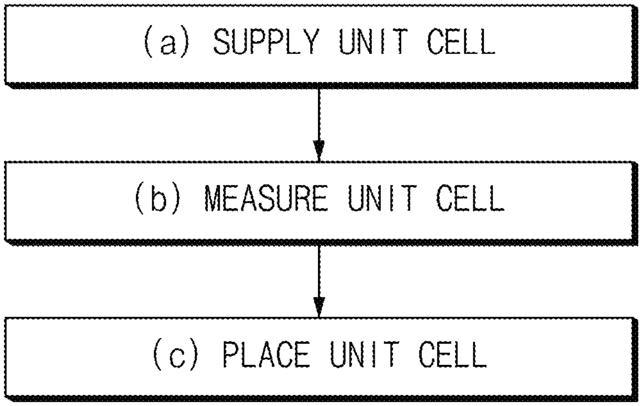
FIG. 11 is a flowchart showing an electrode assembly manufacturing method according to the third embodiment of the present invention.

Electrode Assembly Manufacturing Method According to Third Embodiment of Invention The electrode assembly manufacturing method according to the third embodiment of the present invention includes, as illustrated in FIG. 11, (a) supplying a unit cell 10, (b) measuring an edge of an electrode 11 included in the supplied unit cell 10 and using the measured edge of the electrode 11 to measure the position of the electrode 11, and (c) sequentially placing the unit cells 10, which are determined as normal, to manufacture an electrode assembly.

Meanwhile, the electrode assembly manufacturing method according to the third embodiment of the present invention utilizes an electrode assembly manufacturing equipment, and the electrode assembly manufacturing equipment includes a unit cell supply device 100, a unit cell inspecting device 200, and a unit cell placing device 300.

In the operation of (a), the unit cell 10 is supplied by using the unit cell supply device 100. Meanwhile, the unit cell 10 has a structure in which electrodes 11 and separators 12 are alternately disposed on each other, and the electrode 11 includes a positive electrode 11*a* and a negative electrode 11*b*. Meanwhile, the negative electrode 11*b* has a larger area than the positive electrode 11*a*, and each of the separators 12 has a larger area than the negative electrode 11*b*.

Here, the unit cell 10 has a four layer structure in which a positive electrode 11*a*, a separator 12, a negative electrode 11*b*, and a separator 12 are sequentially disposed on each other in the up-down direction.

In the operation of (b), an image of the edge of the unit cell supplied during the operation of (a) is captured with long-wave infrared rays by using the unit cell inspecting device 200, the edge of the negative electrode 11*b* among the electrodes included in the unit cell 10 is measured, and the position of the negative electrode 11*b* is measured by using the measured edge of the negative electrode 11*b*.

For example, the operation of (b) includes a conveyance process, a heating process, an image capturing process, and an inspection process. The unit cell inspecting device 200 includes a conveyance unit 210 and an inspection unit 220. The inspection unit 220 includes a conveyance part, a main heating part 221, an image capturing part 222, an inspection part 223, and an auxiliary heating part 224.

During the conveyance process, the unit cell 10 supplied in the operation of (a) is conveyed to the inspection unit 220 via the conveyance unit 210.

During the heating process, both ends of the unit cell 10 (preferably, the edges of the unit cell) conveyed to the inspection unit 220 are heated by the main heating part 221, and thus, the temperature of the electrode 11 included in the unit cell 10 is raised. Here, during the heating process, the main heating part 221 heats the edges of the unit cell 10 by using the long-wave infrared lamp.

In particular, the auxiliary heating part 224 is used during the heating process to heat the bottom surface of the end of the unit cell 10 conveyed to the inspection unit 220, thereby raising the temperature of the electrode 11 included in the unit cell 10.

During the image capturing process, the image of the edge of the unit cell 10 is captured with the long-wave infrared rays by using the image capturing part 222, thereby acquiring a thermal image of the edge of the electrode 11 included in the unit cell 10. That is, the thermal image of the edge of the positive electrode 11*a* and the thermal image of the edge of the negative electrode 11*b* are acquired.

Here, the image capturing part 222 accurately captures the image of the edge of the unit cell 10 by using the long-wave infrared camera.

To sum up, during the image capturing process, the image of the edge of the positive electrode 11*a* is captured directly by using the long-wave infrared rays, and the image of the edge of the negative electrode 11*b* is captured by using the long-wave infrared rays which has passed through the separator 12.

During the inspection process, the edges of the negative electrode 11*b* are measured, by the inspection part 223, in the thermal image of the edges of the negative electrode 11*b* among the electrodes, and the position of the negative electrode 11*b* is measured by connecting the measured edges of the negative electrode 11*b* to each other. Here, the position of the negative electrode 11*b* may represent the entire area of the negative electrode 11*b* or the center point of the negative electrode 11*b*.

In particular, during the inspection process, it is inspected whether the edge of the electrode is deformed or not by comparing the thermal image of the edge of the electrode with the normal image of the edge of the electrode input in advance.

In the operation of (c), the unit cells 10, which have been determined as normal in the operation of (b), are sequentially placed on each other by the unit cell placing device 300, thereby manufacturing an electrode assembly 1. In this case, the unit cells 10 are placed on the basis of the negative electrodes 11*b*.

Here, the unit cell placing device 300 includes a unit cell placing unit 310 and a unit cell inspecting unit 320.

That is, during the operation of (c), the unit cells 10, which have been inspected by the unit cell inspecting device 200, are sequentially stacked on each other by the unit cell placing unit 310, thereby manufacturing the electrode assembly 1.

During this operation of (c), a skew fail (fail such as distortion) of the unit cells 10, which are being stacked on each other, is inspected by the unit cell inspecting unit 320.

When the above operations are completed, the final electrode assembly 1 may be manufactured.

Experimental Example

A plurality of unit cells 10 are prepared, each of which has a four layer structure in which a positive electrode 11*a*, a separator 12, a negative electrode 11*b*, and a separator 12 are sequentially disposed on each other in the up-down direction.

Comparative Example

Figure 12:
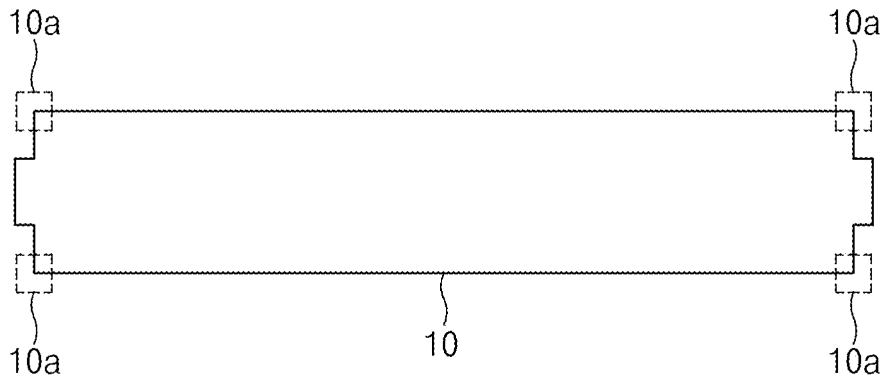
FIG. 12 is a plan view of an experimental example of the present invention, showing edges of which images are to be captured.

An optics-based thermal image camera is prepared, and images of edges 10*a* of a unit cell 10 are captured as illustrated in FIG. 12.

Preparation Example

An optics-based long-wave infrared camera is prepared, and images of edges 10*a* of a unit cell 10 are captured as illustrated in FIG. 12. Meanwhile, the optics-based long-wave infrared camera in the preparation example has the same structure as the image capturing part 222 provided in the second embodiment of the present invention.

Experimental Results

Figure 13:
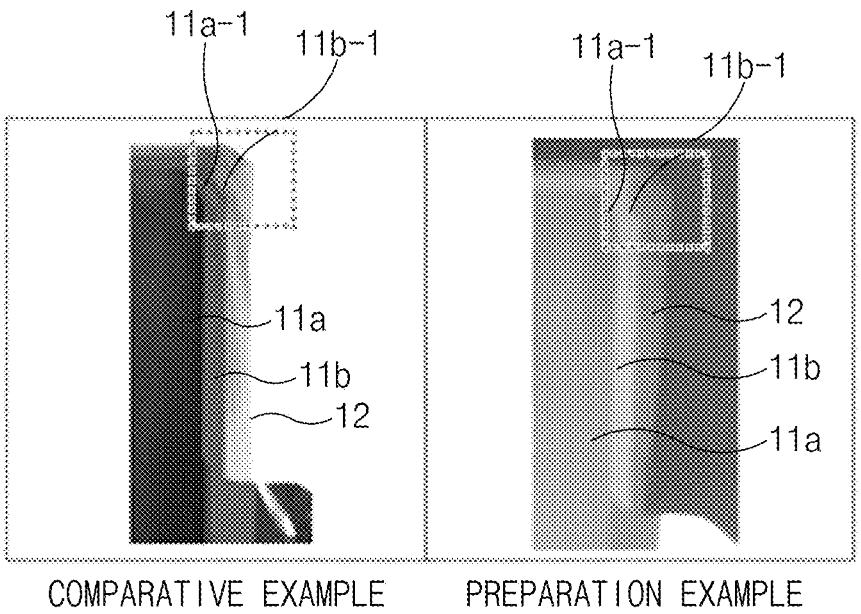
FIGS. 13 and 14 are thermal images of edges of a unit cell captured in a comparative example and a preparation example of the present invention.
Figure 14:
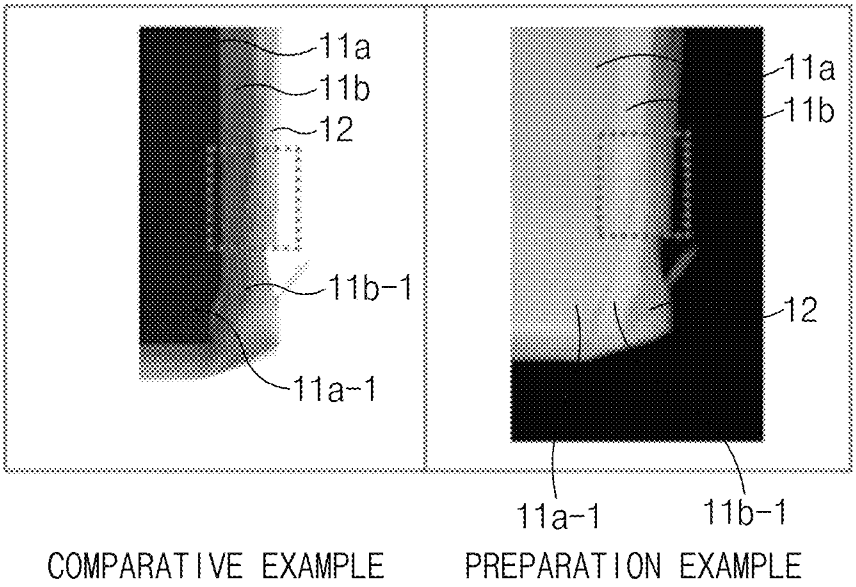

When a portion of the images of the preparation example and a portion of the images of the comparative example, which are obtained by capturing the images of the edges of the unit cell 10, are compared with each other, the comparison is shown in FIGS. 13 and 14.

In FIG. 13, when comparing the image of the comparative example and the image of the preparation example, which are obtained by capturing the images of the same edge of the unit cell 10, it may be confirmed that the images of an edge 11*a*-1 of the positive electrode 11*a*, the separator 12, an edge 11*b*-1 of the negative electrode 11*b* are captured. In particular, it may be confirmed that the preparation example shows more accurate and clear image of the edge 11*a*-1 of the positive electrode 11*a*, the separator 12, and the edge 11*b*-1 of the negative electrode 11*b* than the comparative example. In particular, in the preparation example, it may be accurately confirmed that folding occurs at the edge 11*b*-1 of the negative electrode 11*b*.

In FIG. 14, in the image of the comparative example and the image of the preparation example, it may be confirmed that the images of an edge 11*a*-1 of the positive electrode 11*a*, the separator 12, an edge 11*b*-1 of the negative electrode 11*b* are captured. In particular, it may be confirmed that the preparation example shows more accurate image of the edge of the positive electrode 11*a*, the separator 12, and the edge of the negative electrode 11*b* than the comparative example. In particular, in the preparation example, it may be accurately confirmed that wrinkling occurs at the edge 11*b*-1 of the negative electrode 11*b*.

Therefore, it may be confirmed that the preparation example, in which the optics-based long-wave infrared camera is used, can more accurately capture the image of the negative electrode 11*b* than the comparative example.

The scope of the present invention is defined by the appended claims rather than the detailed description, and various embodiments derived from the meaning and scope of the claims and their equivalent concepts are also possible.

DESCRIPTION OF THE SYMBOLS

1: Electrode assembly
10: Unit cell
10*a*: Unit cell edge
11: Electrode
11*a*: Positive electrode
11*a*-1: Positive electrode edge
11*b*: Negative electrode
11*b*-1: Negative electrode edge
12: Separator
100: Unit cell supply device
200: Unit cell inspecting device
210: Conveyance unit
220: Inspection unit
221: Main heating part
222: Image capturing part
223: Inspection part
224: Auxiliary heating part
224*a*: Support plate
224*b*: Heating piece
230: Body unit
231: lower body
232: Upper body
233: First bracket
233*a*: Up-down coupling portion
233*b*: Left-right coupling portion
233*c*: Front-rear coupling portion
234: Second bracket
300: Unit cell placing device
310: Unit cell placing unit
320: Unit cell inspecting unit
321: Unit cell lighting part

The invention claimed is:

1. A unit cell inspecting device comprising an inspection unit for capturing an image of an edge of a unit cell and measuring a position of an edge of an electrode provided in the unit cell,
wherein the inspection unit comprises:
a main heating part configured to heat the edge of the unit cell, thereby raising a temperature of the edge of the electrode provided in the unit cell;
an image capturing part configured to capture the image of the edge of the unit cell based on long-wave infrared rays emitted from the edge of unit cell in a heated state, thereby acquiring a thermal image of the edge of the electrode provided in the unit cell; and
an inspection part configured to measure the edge of the electrode in the thermal image captured by the image capturing part, thereby measuring the position of the electrode by using the measured edge of the electrode, and
wherein the inspection part compares the thermal image captured by the image capturing part with a normal image of an edge of an electrode input in advance, thereby further inspecting whether the edge of the electrode is deformed or not.

2. The unit cell inspecting device of claim 1, wherein the unit cell has a structure in which an electrode is located between separators, and the image capturing part acquires the thermal image of the edge of the electrode provided in the unit cell as the long-wave infrared rays pass through at least one of the separators.

3. The unit cell inspecting device of claim 1, wherein the image capturing part is provided with four long-wave infrared cameras that respectively capture the images of edges of the unit cell, the main heating part is provided with four long-wave infrared lamps that respectively heat the edges of the unit cell by using infrared light, thereby raising the temperature of the electrode provided in the unit cell, and the four long-wave infrared lamps are respectively coupled to the four long-wave infrared cameras.

4. The unit cell inspecting device of claim 1, wherein the inspection unit further comprises an auxiliary heating part which supports and heats both ends of the unit cell positioned in the image capturing part, thereby raising the temperature of the edge of the electrode provided in the unit cell.

5. The unit cell inspecting device of claim 1, further comprising a conveyance unit which conveys the unit cell to the inspection unit.

6. The unit cell inspecting device of claim 5, further comprising a body unit on which the inspection unit and the conveyance unit are installed, wherein the body unit comprises a lower body on which the conveyance unit is installed, an upper body which is installed above the lower body, and a first bracket which couples the inspection unit to the upper body, and the first bracket comprises an up-down coupling portion coupled to the upper body, a left-right coupling portion coupled to the up-down coupling portion, and a front-rear coupling portion having one end coupled to the left-right coupling portion and the other end coupled to the image capturing part.

7. The unit cell inspecting device of claim 6, wherein the up-down coupling portion is coupled to the upper body such that the height of the up-down coupling portion is adjustable in the thickness direction of the unit cell, and the height of the image capturing part is adjusted with respect to the unit cell, the left-right coupling portion is coupled to the up-down coupling portion such that the position of the left-right coupling portion is adjustable in the full length direction of the unit cell, and the position of the image capturing part is adjusted in the full length direction of the unit cell, and the image capturing part is coupled to the front-rear coupling portion such that the position of the image capturing part is adjustable in the full width direction of the unit cell, and accordingly, the position of the image capturing part is adjusted in the full width direction of the unit cell.

8. The unit cell inspecting device of claim 7, wherein the body unit further comprises a second bracket which connects the front-rear coupling portion and an auxiliary heating part, which are positioned vertically, to each other to increase a fixing force of the front-rear coupling portion, and the front-rear coupling portion is coupled to the second bracket such that the height of the front-rear coupling portion is adjustable in the thickness direction of the unit cell.

9. The unit cell inspecting device of claim 1, wherein the electrode comprises a negative electrode.

10. Electrode assembly manufacturing equipment comprising:

a unit cell supply device configured to supply a unit cell;

the unit cell inspecting device of claim 1, which uses the long-wave infrared rays to capture the image of an edge of the unit cell supplied by the unit cell supply device, measures the position of the edge of an electrode provided in the unit cell, and uses the measured edge of the electrode to measure the position of the electrode; and a unit cell placing device configured to sequentially place unit cells on the basis of the position of the electrode measured by the unit cell inspecting device.

11. The electrode assembly manufacturing equipment of claim 10, wherein the unit cell placing device comprises a unit cell placing unit configured to sequentially place the unit cells in which the positions of the electrodes have been measured and a unit cell inspecting unit configured to inspect the placement state of the unit cells which are sequentially placed.

12. An electrode assembly manufacturing method comprising:

(a) supplying the unit cell to the unit cell inspecting device of claim 1;

(b) capturing the image of the edge of the supplied unit cell based on the long-wave infrared rays emitted therefrom, measuring the position of the edge of the electrode provided in the unit cell, and using the measured edge of the electrode to measure the position of the electrode; and (c) sequentially placing the unit cells, in which the positions of the electrodes have been measured, to manufacture an electrode assembly, wherein the operation of (b) comprises:

a conveyance process of conveying the unit cell supplied during the operation of (a);

a heating process of heating the edge of the conveyed unit cell to raise a temperature of the electrode provided in the unit cell;

an image capturing process of capturing the image of the edge of the unit cell based on the long-wave infrared rays emitted therefrom, thereby acquiring the thermal image of the edge of the electrode provided in the unit cell; and an inspection process of measuring the edge of the electrode in the thermal image of the edge of the electrode and using the measured edge of the electrode to measure the position of the electrode.

13. The electrode assembly manufacturing method of claim 12, wherein a long-wave infrared lamp is used to heat the edge of the unit cell during the heating process, and a long-wave infrared camera is used to capture the image of the edge of the unit cell during the image capturing process.

14. The electrode assembly manufacturing method of claim 13, wherein the unit cell has a structure in which an electrode is located between a first separator and a second separator, and the electrode is provided as a negative electrode, wherein during the image capturing process, the long-wave infrared rays are used and allowed to pass through at least one of the first or second separators, thereby capturing the image of the edge of the negative electrode.

* * * * *